June 12, 1928.

J. BERGE 1,673,486

FASTENER HEAD COVER

Filed June 17, 1925

INVENTOR
Joseph Berge
BY
H. H. Dyke
ATTORNEY

Patented June 12, 1928.

1,673,486

UNITED STATES PATENT OFFICE.

JOSEPH BERGE, OF MONTCLAIR, NEW JERSEY.

FASTENER-HEAD COVER.

Application filed June 17, 1925. Serial No. 37,842.

My invention is of a cover for heads of fasteners, such as screws, nails or the like.

The object of the invention is to provide a cover, which is readily applied and which gives a pleasing and ornamental appearance covering the head of any kind of fastener, such as a cheap flathead wood screw, for example, and betrays tampering with the cover or fastener.

In accordance with the present invention a perforated member is provided with a marginal, preferably upwardly extending, flange or extension, as, for example, a member in the form of a straight sided cup with a hole in the bottom, the bottom serving substantially as a washer under the fastener head, and the shank of the screw or other fastener being passed through the hole when the fastener is screwed or driven into place.

This cup-like member is of readily deformable or flowable, preferably metallic material, such as tin alloy, nickel silver, deep drawing copper or the like, and after it is in place with the fastener screwed or driven into place and the washer or base portion under the fastener head, the flange or wall portion of the cup is closed by means of suitable punches, spring tools, or the like, either being entirely closed in a manner similar to that used in making hollow spherical balls, or with the edges brought close and crimped together with preferably a central depression, so that a pleasing fluted appearance more or less resembling the flower or blossom end of a fruit, such as an apple or the like. A great latitude of rustic or highly finished surfaces and appearance can be obtained according to the desires or fancy of the mechanic and the tools made use of.

Figure 1:
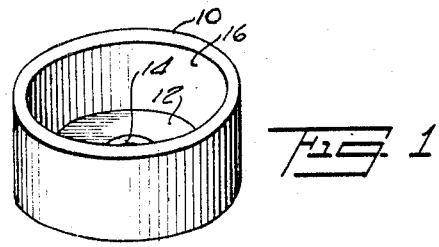
Figure 2:
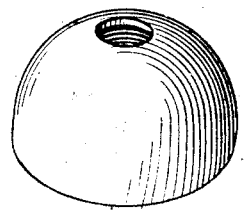
Figure 3:
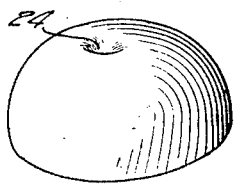
Figure 4:
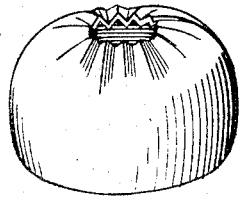
Figure 5:
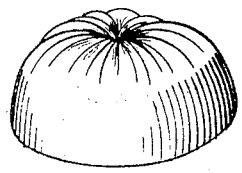
Figure 6:
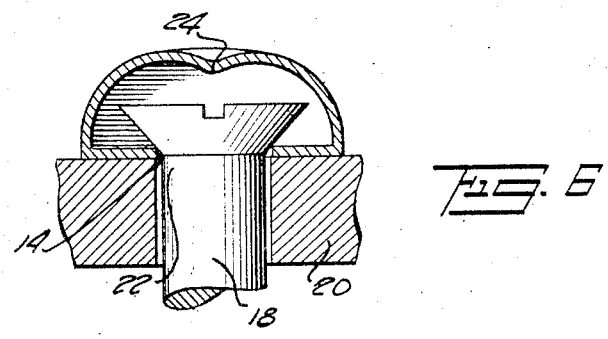

The accompanying drawings illustrate embodiments of the invention. Fig. 1 is a perspective view of a cup with perforated bottom comprising a blank for a cover. Fig. 2 is a perspective of a cover partially closed. Fig. 3 is a perspective of a cover closed and with an indented crown. Fig. 4 is a view similar to Fig. 2, but showing indentations in the meeting edges. Fig. 5 is a view showing the cover of Fig. 4 completely closed and with indentations meeting at the center so as to resemble the flower end of an apple or the like, and Fig. 6 is a central section through the crimped cover or crown of Fig. 3 in place on a wood screw.

The blank 10 of deformable, relatively soft metal comprises a bottom or washer part 12 containing the hole 14, and the preferably cylindrical flange or body part 16. When the fastener, as wood screw 18, is applied, as, for example, to fasten pane 20 to a board or the like, the shank 22 of the screw 18 is passed through the hole 14, the portion 12 of the blank serving as a washer.

After the fastener is in place in this manner, force is applied to the flange 16, as by means of a suitable punch or punches, or by a spinning tool or the like, to bring the edges together and by a suitable flowing of the soft metal, the material of flange 16 is brought into the form of a closed or practically closed crown. If spun or closed with suitable smoothly recessed punches, the crown may be substantially spherical and, if desired, may be given a central depression or dimple 24. If the material is simply crowded together by a suitable tool, as indicated in Figs. 4 and 5, the resulting shape of crown is centrally serrated and may resemble the top of an apple or other fruit. Various other forms can be obtained, as will be readily understood.

The invention is not limited to the forms shown for illustration, but is of the scope defined in my claims.

I claim:

1. The process of covering a fastener head, which comprises inserting the stem of the headed fastener through the hole in a metallic washer which is materially larger than the head of said fastener, until insertion is limited by the fastener head, said washer extending beyond the head around all its sides, and flowing the excess metal of said washer into a cover for the head.

2. The process of covering a fastener head which comprises inserting the stem of the headed fastener through a hole in the bottom of a perforated cup until insertion is limited by the fastener head, which cup forms a washer and projects beyond the fastener head around all its sides, and flowing the material of the cup walls into a closed cover for the head.

3. The process of covering a fastener head, which comprises inserting the stem of the headed fastener through a hole in the bottom of a cup of soft metal having a substantially cylindrical side wall or flange, until insertion is limited by the fastener heads, and flowing the material of the flange convergingly into substantially a closed cover for the head.

4. The process of covering a fastener head, which comprises inserting the stem of the headed fastener through a hole in the bottom of a flanged cup of soft metal until insertion is limited by the fastener head, and crimping the flange walls forcibly together, whereby the metal is flowed and a substantially closed cover for the head is formed provided with centrally converging and depressed serrations.

In testimony whereof, I have signed my name hereto.

JOSEPH BERGE.